UNITED STATES PATENT OFFICE.

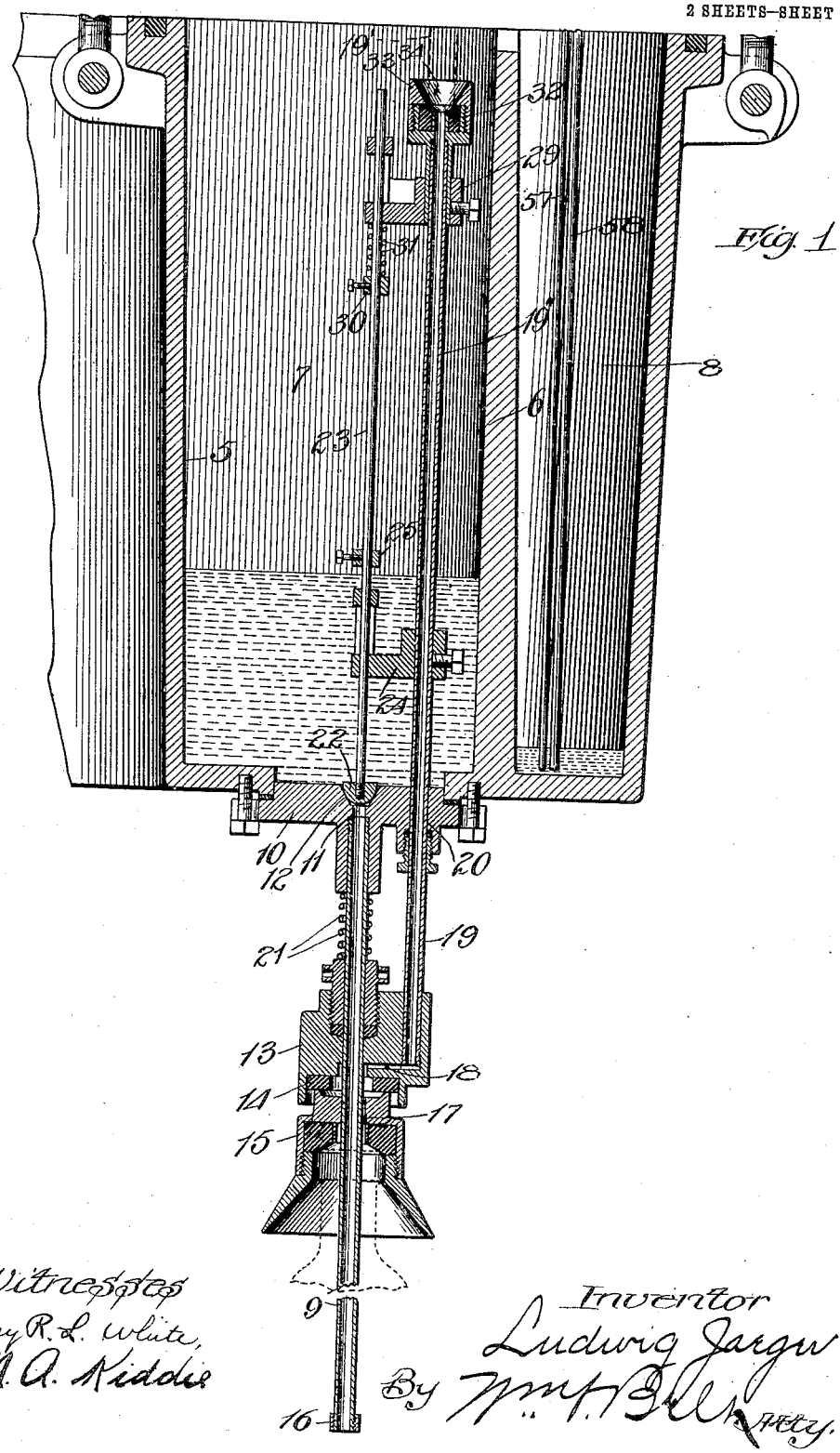

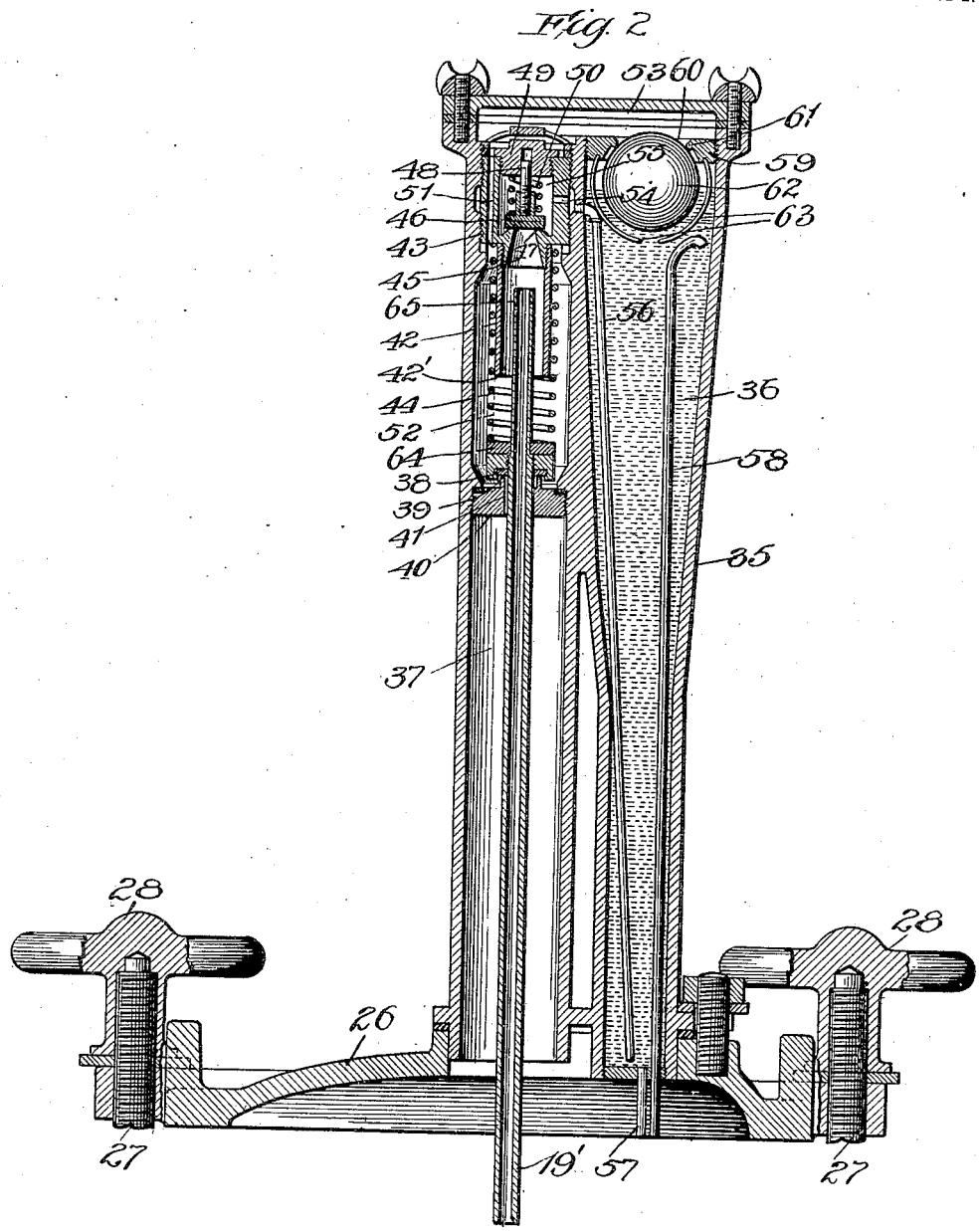

LUDWIG JAEGER, OF CHICAGO, ILLINOIS, ASSIGNOR TO BOTTLERS MACHINERY MANUFACTURING COMPANY, OF CHICAGO, ILLINOIS, A CORPORATION OF ILLINOIS.

FILLING-MACHINE.

971,894.      Specification of Letters Patent.      Patented Oct. 4, 1910.

Application filed October 2, 1907. Serial No. 395,472.

*To all whom it may concern:*

Be it known that I, LUDWIG JAEGER, a subject of the Emperor of Germany, residing at Chicago, in the county of Cook and State of Illinois, have invented new and useful Improvements in Filling-Machines, of which the following is a specification.

In filling bottles with beer and other charged liquids at the present time provision is sometimes made for retarding the escape of air or gas from the bottle during the filling operation to regulate the inflow of beer, but as far as I am aware, this retardation of the escape of air or gas has been uniform during the filling operation and no attempt has been made to regulate or control the escape of air or gas as the hydrostatic head of the beer decreases during the filling operation. When this retardation is uniform the velocity of the beer will vary with the variation in the hydrostatic head and this may cause an agitation of the beer and produce foaming. But if the escape of air or gas is regulated according to the change constantly taking place in the hydrostatic head during the filling operation the velocity of the beer flowing into the bottle will be maintained constant and agitation and foaming entirely avoided.

It is my object to avoid the disadvantages of the present methods of filling bottles with beer and other charged liquids by maintaining the velocity of the liquid flowing into the bottle constant throughout the filling operation and avoiding all changes in velocity ordinarily due to variations in the hydrostatic head of the liquid.

Another object of the invention is to provide a filling machine of large capacity and which can be operated rapidly without causing the liquid to foam. And a further object is to provide means for automatically and positively regulating and controlling the escape of air or gas from the bottle during the filling operation, not only to retard the escape but also to compensate for the loss in hydrostatic head at the same time and thus maintain a constant velocity for the inflowing liquid.

As the invention is especially important in connection with filling beer I will hereafter refer to this particular use, but it will be understood of course that the invention presents the same advantages in filling other charged liquids.

In the accompanying drawings illustrating one embodiment of the invention Figures 1 and 2 are sectional views showing as much of a filling machine as is necessary to understand the invention, Fig. 2 showing the lid of the tank illustrated in Fig. 1 and adapted to be secured, with the parts carried thereby, on said tank.

Referring to the drawings 5 is a tank of suitable character provided with a partition 6 which does not extend to the top of the tank and which divides the tank into a beer chamber 7 and a water chamber 8. A constant head of beer is maintained in the chamber 7. The tank may be circular in form and provided with a plurality of filling mechanisms to all of which the beer chamber 7 and the water chamber 8 are common. For the present purpose it is only necessary to show and describe a machine having one filling mechanism. A filling tube 9 is secured in a body 10, the latter having a bore 11, to form a communication between the tube and tank, and a valve seat 12 at the upper end of the bore. A head 13 is arranged to slide on the filling tube and it is provided with a seat 14 to receive the upper end of the guide bell 15 for centering the bottle on the filling tube. This bell is slidable on the filling tube and a collar 16 prevents the bell from slipping off the filling tube. The bell and head have air or gas passages 17, 18, the latter communicating with an air tube 19 which is secured in the head and projects upward through an opening 20 in the body 12 into the beer chamber. Fig. 1 shows the bell pushed up by a bottle and seated against the head preparatory to moving the head for a purpose hereafter described. A spring 21 on the filling tube between the body and head will return the head and the parts connected therewith to lowered position, as shown in Fig. 1, when the pressure of the bottle is withdrawn and at the same time the bell will slide by gravity to the lower end of the filling tube.

A beer valve 22 is normally seated on the seat 12 to close the filling tube and this valve is carried by a rod 23 which projects through a bracket 24 fastened on the air tube within the beer chamber. A collar 25 is fastened on the rod 23 above the bracket 24 so that the bracket will engage with said collar when the air tube has been raised sufficiently and unseat the beer valve.

The air tube 19 is made in two sections 19', 19'', the upper section 19' being carried on the lid 26 of the tank, this lid being secured tightly on the tank by bolts 27 and nuts 28. The air tube is made in two sections so that the lid can be removed from the tank when desired without requiring the disconnection of any of the parts. A bracket 29 is secured on the section 19'' of the air tube within the beer chamber and this bracket forms a guide for the rod 23. A collar 30 is fastened on the rod 23 and a spring 31 is arranged on said rod between the bracket 29 and collar 30 to return the valve 22 against its seat. The section 19'' of the air tube is provided at its upper end with a seat 32 against which the lower end of the section 19' normally seats when the tank lid is on and a guide 33 having a conical opening 34 is secured to the section 19'' of the air tube above the seat 32 to guide the section 19' of the air tube into position against the said seat.

A casing 35 for each filling valve is mounted on the lid 26 of the tank and this casing is provided with a water chamber 36 and another chamber 37 (Fig. 2). The section 19' of the air tube is arranged within the chamber 37 and it carries, below its upper end, an air valve 38 which seats against a seat 39 on a plug 40 secured within said chamber. This plug has an air passage 41 which is closed when the air valve is seated. The upper end of the air tube section 19' projects into an enlarged sleeve 42 which is suspended from a valve casing 43 within the upper end of the chamber 37. A spring 44 is arranged on the sleeve 42 and bears against the casing 43 and the air valve 38 to hold said valve normally against its seat. The casing 43 has a bore 45 which communicates with the sleeve 42 and is located above the upper end of the air tube section 19' and a valve 46 is arranged within this casing and seats against a seat 47 at the upper end of said bore. The stem 48 of valve 46 is guided in a screw plug 49 in the upper end of the casing and a spring 50 on said stem holds the valve 46 normally against its seat. An air passage 51 in the valve casing 43 forms a communication between the valve chamber 52 above the air valve and an air passage 53 at the top of the casing 35. A port 54 in the valve casing 43 forms a communication between the valve chamber 55 and an air pipe 56 which extends down adjacent to the bottom of the water chamber 36. A water pipe 57 is secured in the bottom of the water chamber 36 and extends down adjacent to the bottom of the water chamber 8 in the tank. A supplemental water pipe 58 is secured in the bottom of the water chamber 36 and extends nearly to the top thereof and adjacent to the bottom of the water chamber 8 in the tank. A plug 59 having a valve opening 60 and valve seat 61 is secured in the casing 35 at the top of the water chamber 36 and a ball valve 62 is held in place at the top of said water chamber 36 by arms 63 to engage said seat. The air passage 53 communicates through said valve opening 60 with the top of the water chamber 36.

In practice the water chamber 8 may be filled nearly to the top with water and when the beer is introduced to the beer chamber under pressure the pressure will force the water up through the pipes 57 and 58 into the chamber 36 until the ball 62 is seated. When a bottle pushes the guide bell 15 up against the head 13 and moves the head up on the filling tube, the air tube carried by the head will rise and unseat the air valve 38, thereby establishing communication between the beer chamber and the bottle through the chamber 37, passage 41, chamber 52, sleeve 42, air tube 19 and the passages 18 and 17 in the head and guide bell to permit an equalization of pressure in the bottle and beer chamber before the beer valve is opened. At the same time the pressure in passages 51 and 53 is equalized with the pressure in the tank so that the water will begin to flow from the chamber 36 into the chamber 8, the ball valve 62 opening as the water escapes from chamber 36. Only a comparatively small and immaterial quantity of water will flow out of chamber 36 before the beer valve 22 is opened for it will be understood that the beer valve is opened very quickly after the air valve 38 is opened. When the bracket 24 engages the collar 25 on the continued upward movement of the head the beer valve 22 will be opened to permit the beer to flow from the beer chamber into the bottle. At the same time a valve 64 on the air tube seats against the lower end 42' of the sleeve 42 and the upper end of the air tube engages and unseats the valve 46. Then the air escaping from the bottle passes through lateral ports 65 in the upper end of the air tube into the chamber 55 and through the port 54 into the air pipe 56. The air escapes from the lower end of the air pipe 56 and passes up through the water in the chamber 36 in the form of bubbles. The water in chamber 36 flows through the pipe 57 into the chamber 8 by gravity only; for when valve 38 is opened the pressure in the bottle is equalized with the pressure in the beer chamber and in the water chamber 8. As just mentioned the water is caused to flow from the chamber 36 to the chamber 8 by gravity. When valve 64 is seated the air escaping from the bottle works against the head of water in the chamber 36.

The water chamber 8 may be called the storage chamber and it can be made in any suitable shape. The water chamber 36 may be called the gravity chamber and it is preferably tapered or contracted at its lower end to correspond in a general way with the taper shape of a bottle in inverted position. The hydrostatic head of the beer changes gradually as the bottle is filled and hence it becomes necessary to regulate the flow of water from the chamber 36 to the chamber 8 in accordance with the variation in hydrostatic head of the beer in order to maintain the flow of beer at a constant velocity. It is for this reason that I make the gravity chamber in tapered form corresponding somewhat to an inverted bottle so that the velocity of the water flowing from the gravity chamber to the storage chamber will decrease to correspond with the loss of hydrostatic head.

By the time the bottle has been filled the gravity chamber will be empty and when the bottle is lowered the spring 21 will push the head 13 down to its lowered position, carrying with it the air tube, and the liquid valve will close by gravity and under influence of the spring 31. At the same time the valves 46 and 38 will be carried against their seats and the valve chamber 52 will be open to the atmosphere through the air tube and the air passages 18 and 17. At this time the gravity chamber 36 is also opened to the atmosphere through the valve opening 60, the passages 53 and 51, the valve chamber 52, the air tube and the air passages 18 and 17. Then the air pressure in the beer chamber and water storage chamber 8 forces the water up through the pipes 57 and 58 into the gravity chamber until the valve 62 is carried against its seat. The two pipes 57 and 58 are provided in order to return the water to the gravity chamber quickly so that the filling operation may be resumed at once.

It will be observed that the air which is forced out of the bottle during the filling operation escapes from the water pipe 56 at the bottom of the gravity chamber and rises in the form of bubbles through the water to the top of the gravity chamber. The water retards the escape of air from the bottle and causes the air in the bottle to form, in effect, a cushion for the inflowing beer by providing a somewhat greater pressure in the bottle than in the tank and preventing the discharge of beer in the bottle at a pressure which would tend to produce foaming. The water in the gravity chamber not only forms a check to retard the escape of air from the bottle as described but also provides for automatically varying the retardation of the escape of air from the bottle as the hydrostatic head of the beer changes to provide a constant velocity for the beer.

It will be readily understood that the resistance caused by the water to the escape of the air in the gravity chamber is reduced as the water flows out of the chamber, and as the beer flows into the bottle to reduce the hydrostatic head.

What I claim and desire to secure by Letters Patent is:

1. In a bottle filling machine, the combination of a liquid tank, a liquid valve, an air connection between the tank and the bottle being filled to permit an equalization of pressure in the bottle and tank before the liquid flows into the bottle, and means for controlling the escape of air from the bottle during the filling operation to enable the liquid to flow into the bottle at a constant velocity regardless of the loss of hydrostatic head during the filling operation.

2. In a bottle filling machine, the combination of a liquid tank, a liquid valve, an air connection between the tank and the bottle being filled to permit an equalization of pressure in the bottle and tank before the liquid flows into the bottle, and means for automatically regulating the escape of air from the bottle during the filling operation to enable the liquid to flow into the bottle at a constant velocity regardless of the loss of hydrostatic head during the filling operation.

3. In a bottle filling machine, the combination of a liquid tank, a liquid valve, an air connection between the tank and the bottle being filled to permit an equalization of pressure in the bottle and tank before the liquid flows into the bottle, and means for maintaining a higher pressure in the bottle than in the tank after the flow of liquid commences and at the same time automatically regulating the pressure in the bottle to compensate for the loss of hydrostatic head of the liquid as the bottle is filled.

4. In a bottle filling machine, the combination of a liquid tank, a liquid valve, an air connection between the tank and the bottle being filled to permit an equalization of pressure in the bottle and tank before the liquid flows into the bottle, and means for retarding the escape of the air in the bottle after the flow of liquid commences and at the same time automatically regulating this retardation to compensate for the loss of hydrostatic head of the liquid as the bottle is filled.

5. In a bottle filling machine, the combination of a liquid tank, a liquid valve, an air connection between the tank and the bottle being filled to permit an equalization of pressure in the bottle and tank before the liquid flows into the bottle, and a water check for automatically regulating the escape of air from the bottle during the filling operation to enable the liquid to flow into the bottle at a constant velocity regardless of the loss of hydrostatic head during the filling operation.

6. In a bottle filling machine, the combination of a liquid tank, a liquid valve, an air connection between the tank and the bottle being filled to permit an equalization of pressure in the bottle and tank before the liquid flows into the bottle, and a water column into the bottom of which the air escaping from the bottle as the liquid flows therein is discharged to retard the escape of air and maintain a higher pressure in the bottle than in the tank.

7. In a bottle filling machine, the combination of a liquid tank, a liquid valve, an air connection between the tank and the bottle being filled to permit an equalization of pressure in the bottle and tank before the liquid flows into the bottle, a water column into the bottom of which the air escaping from the bottle as the liquid flows therein is discharged to retard the escape of air and maintain a higher pressure in the bottle than in the tank, and means for gradually reducing the height of said column as the bottle is filled to automatically reduce the resistance to the escape of air from the bottle in proportion to the loss of hydrostatic head of the liquid.

8. In a bottle filling machine, the combination of a liquid tank, a liquid valve, an air connection between the tank and the bottle being filled to permit an equalization of pressure in the bottle and tank before the liquid flows into the bottle, a water chamber into the bottom of which the air escaping from the bottle as the liquid flows therein is discharged, and means for lowering the level of the water in said chamber as the bottle is filled to reduce the resistance to the escape of the air in proportion to the loss of hydrostatic head of the liquid.

9. In a bottle filling machine, the combination of a liquid tank, a liquid valve, an air connection between the tank and the bottle being filled to permit an equalization of pressure in the bottle and tank before the liquid flows into the bottle, a water chamber into the bottom of which the air escaping from the bottle as the liquid flows therein is discharged, and means for permitting the water to flow out of said chamber by gravity as the bottle is filled to reduce the resistance to the escape of the air in proportion to the loss of hydrostatic head.

10. In a bottle filling machine, the combination of a liquid tank, a liquid valve, an air connection between the tank and the bottle being filled to permit an equalization of pressure in the bottle and tank before the liquid flows into the bottle, a water chamber into the bottom of which the air escaping from the bottle as the liquid flows therein is discharged, means for withdrawing the water from said chamber as the bottle is filled to reduce the resistance to the escape of the air in proportion to the loss of hydrostatic head of the liquid, and means for recharging said chamber with water at a greater rate of speed than that of said withdrawal.

11. In a bottle filling machine, the combination of a liquid pressure tank, a liquid valve, an air connection between the tank and the bottle being filled to permit an equalization of pressure in the bottle and tank before the liquid flows into the bottle, a water storage chamber in the tank, a water gravity chamber on the tank and connected with the storage chamber, and means for discharging the air escaping from the bottle as the liquid flows therein into the bottom of the gravity chamber.

12. In a bottle filling machine, the combination of a liquid pressure tank, a liquid valve, an air connection between the tank and the bottle being filled to permit an equalization of pressure in the bottle and tank before the liquid flows into the bottle, a water storage chamber in the tank, a water gravity chamber on the tank and connected with the storage chamber, means for discharging the air escaping from the bottle as the liquid flows therein into the bottom of the gravity chamber, and means for automatically recharging the gravity chamber after the bottle is filled and removed.

13. In a bottle filling machine, the combination of a liquid pressure tank, a liquid valve, an air connection between the tank and the bottle being filled to permit an equalization of pressure in the bottle and tank before the liquid flows into the bottle, a water storage chamber in the tank, a water gravity chamber on the tank and connected with the storage chamber, means for discharging the air escaping from the bottle as the liquid flows therein into the bottom of the gravity chamber and means for establishing atmospheric pressure in the gravity chamber after the bottle is filled to enable the air pressure in the storage chamber to force the water into the gravity chamber.

14. In a bottle filling machine, the combination of a liquid pressure tank having a liquid chamber and a water storage chamber therein, there being a predetermined air pressure maintained in said chambers, a liquid valve, an air connection between the bottle being filled and the tank to permit an equalization of pressure in the bottle and tank before the liquid flows into the bottle, a water gravity chamber connected with the storage chamber and normally filled with water, and means for discharging the air escaping from the bottle as the liquid flows therein into the gravity chamber.

15. In a bottle filling machine, the combination of a liquid pressure tank having a liquid chamber and a water storage chamber therein, there being a predetermined air pressure maintained in said chambers, a liquid valve, an air connection between the bottle being filled and the tank to permit an equalization of pressure in the bottle and tank before the liquid flows into the bottle, a water gravity chamber connected with the storage chamber and normally filled with water, means for discharging the air escaping from the bottle as the liquid flows therein into the gravity chamber, and means for reducing the pressure in the gravity chamber to permit the pressure in the storage chamber to force the water into the gravity chamber after the bottle is filled.

16. In a bottle filling machine, the combination of a liquid pressure tank having a liquid chamber and a water storage chamber therein, there being a predetermined air pressure maintained in said chambers, a liquid valve, an air connection between the bottle being filled and the tank to permit an equalization of pressure in the bottle and tank before the liquid flows into the bottle, a water gravity chamber connected with the storage chamber and normally filled with water, an air pipe discharging into the bottom of the gravity chamber, and means for automatically establishing communication between the air connection and said air pipe by the time the liquid begins to flow into the bottle to permit the air escaping from the bottle to be discharged into said gravity chamber at the bottom of the column of water therein.

17. In a bottle filling machine, the combination of a liquid pressure tank having a liquid chamber and a water storage chamber therein, there being a predetermined air pressure maintained in said chambers, a liquid valve, an air connection between the bottle being filled and the tank to permit an equalization of pressure in the bottle and tank before the liquid flows into the bottle, a water gravity chamber connected with the storage chamber and normally filled with water, an air pipe discharging into the bottom of the gravity chamber, a valve normally closing communication with said air pipe, and means for automatically opening said valve at or about the same time that the liquid valve is opened to permit the escape of air from the bottle through said air pipe into the bottom of the gravity chamber.

18. In a bottle filling machine, the combination of a liquid pressure tank having a liquid chamber and a water storage chamber therein, there being a predetermined air pressure maintained in said chambers, a liquid valve, an air connection between the bottle being filled and the tank to permit an equalization of pressure in the bottle and tank before the liquid flows into the bottle, said air connection comprising a movable air tube, a water gravity chamber connected with the storage chamber and normally filled with water, an air pipe in said gravity chamber, and a valve normally closing communication with said air pipe and adapted to be unseated by the air tube to permit the air from the bottle to flow through said air tube and air pipe into the bottom of the gravity chamber.

19. In a bottle filling machine, the combination of a liquid pressure tank having a liquid chamber and a water storage chamber therein, an air connection between the bottle being filled and the tank to permit an equalization of pressure in the bottle and tank before the liquid flows into the bottle, said connection comprising a movable air tube and an air valve, a liquid valve, means for moving said air tube to open the air valve and liquid valve successively whereby an equalization of pressure in the bottle and tank is obtained before the liquid flows into the bottle, a water gravity chamber connected with the storage chamber and normally filled with water, an air pipe discharging at the bottom of said gravity chamber, and a valve normally closing communication with said air pipe and adapted to be unseated by the air tube to enable the air escaping from the bottle while the liquid flows therein to be discharged through the air pipe into the bottom of the gravity chamber.

20. In a bottle filling machine, the combination of a liquid tank, a liquid valve, an air connection between the bottle being filled and the tank to permit an equalization of pressure in the bottle and tank before the liquid flows into the bottle, a water storage chamber, a water gravity chamber corresponding in shape substantially with an inverted bottle and connected with the storage chamber, said gravity chamber having a column of water held therein by air pressure in the storage chamber, and means for discharging the air escaping from the bottle as the liquid flows therein into the gravity chamber.

21. In a bottle filling machine, the combination of a liquid tank, a liquid valve, an air connection between the bottle being filled and the tank to permit an equalization of pressure in the bottle and tank before the liquid flows into the bottle, a water storage chamber, a water gravity chamber contracted at the bottom and connected with the storage chamber, said gravity chamber having a column of water held therein by air pressure in the storage chamber, and means for discharging the air escaping from the bottle as the liquid flows therein into the gravity chamber.

22. In a bottle filling machine, the combination of a liquid tank, a liquid valve, an air connection between the bottle being filled and the tank to permit an equalization of pressure in the bottle and tank before the liquid flows into the bottle, a water storage chamber, a tapered water gravity chamber narrower at the bottom than at the top and connected with the storage chamber, said gravity chamber having a column of water held therein by air pressure in the storage chamber, and means for discharging the air escaping from the bottle as the liquid flows therein into the gravity chamber.

23. In a bottle filling machine, the combination of a liquid tank, a liquid valve, an air connection between the bottle being filled and the tank to permit an equalization of pressure in the bottle and tank before the liquid flows into the bottle, a water storage chamber, a water gravity chamber connected with the storage chamber and having a column of water held therein by air pressure in the storage chamber, and means for discharging the air escaping from the bottle as the liquid flows therein into the gravity chamber, said gravity chamber being shaped so that it will empty as fast as the bottle fills.

24. In a bottle filling machine, the combination of a pressure tank having a liquid chamber and a water storage chamber therein, a removable lid for the tank, a casing on the lid having a water gravity chamber and an air valve chamber therein, the gravity chamber being connected with the storage and valve chambers, and a valved air tube to establish communication between the bottle and the tank, said tube comprising a section on the tank and a section on the lid.

25. In a bottle filling machine, the combination of a pressure tank having a liquid chamber and a water storage chamber therein, a removable lid for the tank, a casing on the lid having a water gravity chamber and an air valve chamber therein, the gravity chamber being connected with the storage and valve chambers, an air valve within the valve chamber, a valve in the connection between the valve and gravity chambers, and an air tube adapted to be moved to open said valves successively.

26. In a bottle filling machine, the combination of a pressure tank having a liquid chamber and a water storage chamber therein, a casing on the tank having a valve chamber and a water gravity chamber therein, said water storage and gravity chambers being connected and said gravity chamber having an air port at its top, a movable air tube to establish communication between the bottle and the liquid chamber to permit an equalization of pressure therein, an air valve, a liquid valve, and a valve for said air port, all of said valves being operated by the air tube.

27. In a bottle filling machine, the combination of a pressure tank having a liquid chamber and a water storage chamber therein, a casing on the tank having a valve chamber and a water gravity chamber therein, said water storage and gravity chambers being connected and said gravity chamber having an air port at its top, and a movable air tube to establish communication between the bottle and the liquid chamber to permit an equalization of pressure therein, said air tube comprising two sections, one of said sections being located in the liquid chamber and the other in the casing.

28. In a bottle filling machine, the combination of a pressure tank having a liquid chamber and a water storage chamber therein, a casing on the tank having a valve chamber and a water gravity chamber therein, said water storage and gravity chambers being connected and said gravity chamber having an air port at its top, a movable air tube to establish communication between the bottle and the liquid chamber to permit an equalization of pressure therein, said air tube comprising a section located in the tank and a section located in the casing, and a seat at the upper end of the tank section to receive the lower end of the casing section.

29. In a bottle filling machine, the combination of a pressure tank having a liquid chamber and a water storage chamber therein, a casing on the tank having a valve chamber and a water gravity chamber therein, said water storage and gravity chambers being connected and said gravity chamber having an air port at its top, a movable air tube to establish communication between the bottle and liquid chamber to permit an equalization of pressure therein, said air tube comprising a section located in the tank and a section located in the casing, a seat at the upper end of the tank section to receive the lower end of the casing section, and a guide above said seat.

30. In a bottle filling machine, the combination of a pressure tank having a liquid chamber and a water storage chamber therein, a casing on the tank having a valve chamber and a water gravity chamber therein, said water storage and gravity chambers being connected and said gravity chamber having an air port at its top, a movable air tube to establish communication between the bottle and the liquid chamber to permit an equalization of pressure therein, an air valve on said tube within the valve chamber, a sleeve above said air valve, a valve on the tube to seat against said sleeve, and a valve adapted to be unseated by the air tube to open communication with the gravity chamber.

31. In a bottle filling machine, the combination of a pressure tank having a liquid chamber and a water storage chamber therein, a casing on the tank having a valve chamber and a water gravity chamber therein, said water storage and gravity chambers being connected and said gravity chamber having an air port at its top, a movable air tube to establish communication between the bottle and the liquid chamber to permit an equalization of pressure therein, and means for closing communication between the bottle and the liquid chamber when the liquid begins to flow into the bottle and for opening communication between the bottle and the gravity chamber.

32. In a bottle filling machine, the combination of a pressure tank having a liquid chamber and a water storage chamber therein, a casing on the tank having a valve chamber and a water gravity chamber therein, said water storage and gravity chambers being connected and said gravity chamber having an air port at its top, and a movable air tube to establish communication first between the bottle and the liquid chamber and then between the bottle and the gravity chamber.

33. In a bottle filling machine, the combination of a pressure tank having a liquid chamber and a water storage chamber therein, a casing on the tank having a valve chamber and a water gravity chamber therein, said water storage and gravity chambers being connected and said gravity chamber having an air port at its top, a movable air tube to establish communication first between the bottle and the liquid chamber and then between the bottle and the gravity chamber, and a valved opening at the top of the gravity chamber to permit the escape of air while the gravity chamber is being filled.

34. In a bottle filling machine, the combination of a liquid tank, a removable lid for the tank, and an air tube to establish communication between the bottle and the liquid tank to permit an equalization of pressure therein, said air tube comprising two unconnected sections, one section being located in the tank and the other on the lid.

35. In a bottle filling machine, the combination of a liquid tank, a removable lid for the tank, a casing on the lid having a chamber therein, an air tube to establish communication between the bottle and the tank to permit an equalization of pressure therein, said air tube comprising a section in the tank and a separate section in the chamber in the lid, and means for securing an air tight engagement of the adjacent ends of said sections.

LUDWIG JAEGER.

Witnesses:
 W<small>M</small>. O. B<small>ELT</small>,
 M. A. K<small>IDDIE</small>.